(12) United States Patent
Barbu

(10) Patent No.: US 10,735,954 B2
(45) Date of Patent: Aug. 4, 2020

(54) METHOD AND DEVICE FOR FACILITATING AUTHENTICATION OVER A WIRELESS NETWORK

(71) Applicant: BlackBerry Limited, Waterloo (CA)

(72) Inventor: Ion Barbu, Waterloo (CA)

(73) Assignee: BlackBerry Limited, Waterloo (CA)

( * ) Notice: Subject to any disclaimer, the term of this patent is extended or adjusted under 35 U.S.C. 154(b) by 162 days.

(21) Appl. No.: 15/256,347

(22) Filed: Sep. 2, 2016

(65) Prior Publication Data
US 2018/0070231 A1    Mar. 8, 2018

(51) Int. Cl.
| | | |
|---|---|---|
| G06F 7/04 | (2006.01) | |
| G06F 15/16 | (2006.01) | |
| G06F 17/30 | (2006.01) | |
| H04L 29/06 | (2006.01) | |
| H04W 12/06 | (2009.01) | |
| H04W 12/04 | (2009.01) | |
| H04W 12/00 | (2009.01) | |
| H04W 84/12 | (2009.01) | |
| H04W 88/08 | (2009.01) | |

(52) U.S. Cl.
CPC ......... *H04W 12/06* (2013.01); *H04L 63/0815* (2013.01); *H04W 12/0023* (2019.01); *H04W 12/04* (2013.01); *H04W 84/12* (2013.01); *H04W 88/08* (2013.01)

(58) Field of Classification Search
CPC ..... H04W 12/06; H04W 12/08; H04W 84/12; H04W 12/0023; H04W 12/04; H04W 88/08; H04L 63/08; H04L 63/102; H04L 63/0815
See application file for complete search history.

(56) References Cited

U.S. PATENT DOCUMENTS

| | | | |
|---|---|---|---|
| 7,761,710 B2 | 7/2010 | Lillie et al. | |
| 8,588,413 B1 | 11/2013 | Kalbag et al. | |
| 8,594,628 B1 | 11/2013 | Schroeder et al. | |
| 8,799,989 B1 * | 8/2014 | Liu .......... | H04L 63/20 709/219 |
| 9,100,242 B2 | 8/2015 | Nambiar et al. | |
| 9,521,606 B1 * | 12/2016 | Costa .......... | H04L 63/083 |
| 2006/0286977 A1 * | 12/2006 | Khandelwal ....... | H04L 63/0442 455/432.1 |

(Continued)

FOREIGN PATENT DOCUMENTS

CA    2817932 A1    12/2013

*Primary Examiner* — Trong H Nguyen
*Assistant Examiner* — Amie C. Lin
(74) *Attorney, Agent, or Firm* — Moffat & Co

(57) ABSTRACT

One method for allowing and controlling access to an open WLAN network is through the use of a secure website such as a Hotspot or Captive Portal landing page that the device must "log in" to in order to have access to the network. Credentials for a Captive Portal or Hotspot landing page (or other websites) are conventionally managed by a browser application and stored in a browser data storage space. According to some aspects of the disclosure, an electronic device obtains credentials for a website, such as a Captive Portal or Hotspot landing page. The credentials are stored in a network settings space on the electronic device. The credentials may be stored in a WLAN profile. The device may automatically log in to a webpage using the credentials, which may facilitate seamless connectivity.

19 Claims, 11 Drawing Sheets

(56) References Cited

U.S. PATENT DOCUMENTS

| | | | |
|---|---|---|---|
| 2008/0086455 A1 | 6/2008 | Meisels et al. | |
| 2008/0201768 A1* | 8/2008 | Koo | G06F 21/34 726/6 |
| 2009/0187410 A1* | 7/2009 | Wilpon | G10L 15/22 704/270.1 |
| 2009/0217056 A1* | 8/2009 | Malpani | G06F 21/34 713/193 |
| 2013/0133085 A1* | 5/2013 | Tsujimoto | G06F 21/6245 726/28 |
| 2013/0167217 A1* | 6/2013 | Inomata | G06F 21/41 726/8 |
| 2013/0223375 A1* | 8/2013 | Reif | H04W 48/18 370/329 |
| 2013/0318585 A1* | 11/2013 | Hosoda | G06F 21/335 726/7 |
| 2013/0326587 A1* | 12/2013 | Zhu | H04W 12/06 726/3 |
| 2014/0080450 A1 | 3/2014 | Gupta et al. | |
| 2014/0215583 A1* | 7/2014 | Ding | H04W 12/06 726/5 |
| 2014/0258441 A1 | 9/2014 | L'Heureux et al. | |
| 2015/0319102 A1* | 11/2015 | Esdaile | H04W 4/21 709/225 |
| 2015/0382196 A1* | 12/2015 | Hillier | H04W 12/08 726/7 |
| 2016/0019475 A1 | 1/2016 | Bryksa et al. | |
| 2016/0021097 A1 | 1/2016 | Shrotri | |
| 2016/0248744 A1* | 8/2016 | Adderly | H04L 63/08 |
| 2016/0285841 A1* | 9/2016 | Marcy | G06F 21/606 |
| 2016/0360461 A1* | 12/2016 | Travostino | H04W 36/30 |
| 2017/0155751 A1* | 6/2017 | Vissa | H04M 1/72527 |

\* cited by examiner

METHOD AND DEVICE FOR FACILITATING AUTHENTICATION OVER A WIRELESS NETWORK

FIELD OF THE DISCLOSURE

The disclosure relates to facilitating access of an electronic device to a wireless network. More particularly, the disclosure relates to authentication of electronic devices on a secure website.

BACKGROUND

An electronic device capable of wireless communications may establish a connection with a one or more wireless access networks, such as wireless local area networks (WLAN networks) or wireless cellular networks. Example cellular networks include: GSM EDGE Radio Access Network (GERAN); Universal Mobile Telecommunications System (UMTS) Terrestrial Radio Access Network (UTRAN); Evolved UTRAN (E-UTRAN). WLAN network based access networks include Institute of Electrical and Electronics Engineers (IEEE) 802.11 networks (commonly referred to as Wi-Fi networks). An "open" WLAN network is an unsecured and/or unencrypted WLAN network. For example, an open WLAN network will typically not include Wired Equivalent Privacy (WEP) or Wi-Fi Protected Access (WPA) security. Typically, an open WLAN network may be provided in a public location, such as an airport or library. An open WLAN network may also be provided by a private business, such as a coffee shop, restaurant, fitness center, etc. One method for allowing and controlling access to an open network is through the use of a secured website such as a Hotspot or Captive Portal landing page that the device must "log in" to in order to have access to the network. Upon connection to the open WLAN network by the device, the landing page is presented to the user of the electronic device (via a browser application). Credentials such as a user name or password may be required to log in to the landing page in order to authenticate the device. Upon completion of this authentication process, conditional access to the open WLAN network may be granted. Such access techniques may be referred to may be referred to as a Universal Access Method (UAM).

Conventionally, an Application Program Interface (API) that manages Captive Portal authentication does not automatically log in into the WLAN network infrastructure. Rather, the Captive Portal API checks whether the WLAN network connection is a part of a Captive Portal infrastructure, and then hands the login task over to the device's browser application. Existing browser applications may typically store and/or pre-fill the credentials in the Captive Portal landing page. A similar procedure may typically be followed for a Hotspot network.

The authentication of a device for accessing an open WLAN network may be temporary and expire after a predetermined amount of time, thereby requiring re-log in to the Captive Portal or Hotspot webpage in order to re-authenticate the device. Re-authentication may also be required if the electronic device disconnects and reconnects to the open WLAN network (e.g. due to roaming in and out of the coverage area of the open WLAN network). Conventional browser applications do not automatically perform a re-log in. Thus, a user may be periodically required to re-enter and/or resubmit credentials to re-authenticate the electronic device with the Captive Portal or Hotspot landing page. From the perspective of the user, the WLAN network access chain is broken in two places and includes two distinct connectivity stages: (1) the lower network layer, which includes a WLAN profile for Access Point (AP) wireless connectivity; and (2) the higher application layer within the browser for internet/intranet connectivity.

Conventionally, the browser application manages the secured website authentication process and stores credentials for the secured website in a browser data storage space. Such credentials may be vulnerable to being spoofed by third party applications. Captive Portal credentials may, for example, be particularly vulnerable if stored using a third party browser instead of native browser for the device. Furthermore, browser-managed credentials are not conventionally pushed to the device.

Another disadvantage of existing systems is that a device browser may not conventionally associate website credentials with a particular/specific WLAN network or for a specific network access. Existing device browsers are incognizant or act independently of the underlying wireless network access (e.g. Wi-Fi or Cellular), and they are also incognizant or act independently of the lower layer network security (e.g. Wi-Fi encrypted or open connectivity). Conventionally, browsers may store and pre-fill credentials in a webpage regardless of the current network connection.

BRIEF DESCRIPTION OF THE DRAWINGS

The present disclosure will be better understood having regard to the drawings in which.

DETAILED DESCRIPTION

Figure 1:
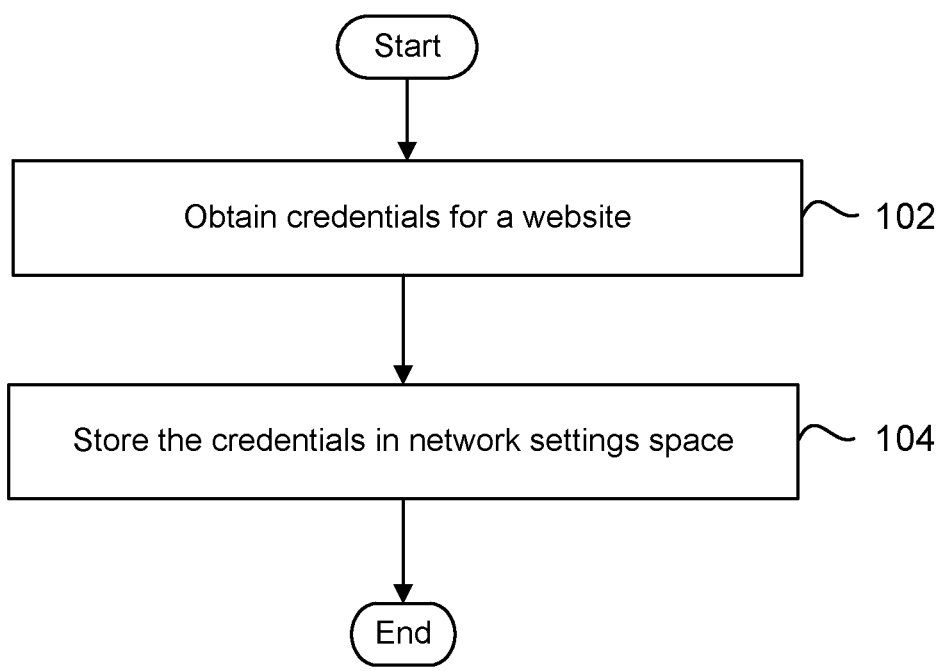
FIG. 1 is a flow chart of a method in an electronic device for facilitating authentication to a secured website according to one embodiment.

According to one aspect, there is provided a method at an electronic device for facilitating authentication on a website over a wireless network, the method comprising: obtaining credentials for the website; storing the credentials in a network settings space on the electronic device.

In some embodiments, storing the credentials in a network settings space comprise storing the credentials in a Wireless Local Area Network (WLAN) profile.

In some embodiments, the wireless network is an open WLAN network, and the website is a landing page for the open WLAN network.

In some embodiments, the landing page is a Captive Portal or Hotspot landing page.

In some embodiments, the method further comprises: retrieving the credentials stored within the WLAN profile; and forwarding the credentials to a network component.

In some embodiments, forwarding the network component is an authentication server.

In some embodiments, the method further comprises storing a Uniform Resource Locator (URL) for the website in the WLAN profile.

In some embodiments, obtaining the credentials comprises receiving the credentials as user input.

In some embodiments, obtaining the credentials comprises receiving the credentials in a transmission.

In some embodiments, the transmission is pushed to the electronic device.

In some embodiments, storing the credentials in the WLAN profile comprises storing the credentials in one or more network security fields in the WLAN profile.

In some embodiments, the one or more security fields are Wired Equivalent Privacy (WEP) or Wi-Fi Protected Access (WPA) security fields.

In some embodiments, the website is a secured website.

In some embodiments, the method further comprises obtaining authorization from a user of the electronic device to store the credentials within the network settings space.

In some embodiments, the method further comprises obtaining authorization to share the credentials between two or more network profiles in the network settings space.

According to another aspect, there is provided an electronic device capable of communication over a wireless network comprising: a processor; a memory, coupled to the processor; a network settings space; a website credential Application Program Interface (API) configured to: obtain credentials for a website; and store the credentials in the network settings space.

In some embodiments, the website credential module stores the credentials within a Wireless Local Area Network (WLAN) profile.

In some embodiments, the website credential API has access to the network settings space.

In some embodiments, the electronic device further comprises a Wi-Fi subsystem, the Wi-Fi subsystem comprising a Wi-Fi manager component, and the website credential API being within the Wi-Fi manager component.

In some embodiments, the website credential API is a Captive Portal API.

In some embodiments, the electronic device further comprises a receiver configured to receive a transmission including the credentials.

In some embodiments, the website credential module is further configured to forward the credentials to a network component over the wireless network.

In some embodiments, storing the credentials in the WLAN profile comprises storing the credentials in one or more network security fields in the WLAN profile.

According to another aspect, there is provided a non-transitory computer-readable medium having processor-executable instructions stored thereon that, when executed on an electronic device, cause the electronic device to: obtain credentials for the website; store the credentials in a network settings space on the electronic device.

Other aspects and features of the present disclosure will become apparent, to those ordinarily skilled in the art, upon review of the following description of the specific embodiments of the disclosure.

Electronic devices that are capable of wireless communication over wireless networks (e.g. cellular or WLAN networks) include several types of devices including mobile stations such as mobile phones/mobile devices, Personal Digital Assistants (PDAs), vehicles (such as cars), tablet computers, and other portable devices such as laptop computers. It will be appreciated by one skilled in the art that the term "mobile device" or "mobile phone" used herein may refer to a mobile station, user equipment, or any other mobile wireless device capable of communicating over a wireless network. The term "network component" as used herein includes an access node. The term access node may refer to a base station (BS), a base node, an evolved base node (eNB), a relay node, or other comparable wireless network radio receiver/transmitter components. In an E-UTRAN network, an access node may be an eNB or a relay node. The terms mobile device, network component and access node are meant generically and do not limit embodiments to any particular wireless system or specification.

Wi-Fi networks are a common type of WLAN network. Although some embodiments described below refer to Wi-Fi networks, it is to be understood that embodiments of the disclosure are not limited to a Wi-Fi environment and embodiments may also be implemented in other types of wireless networks. Embodiments described below are also not limited to WLAN networks, and embodiments may be implemented in any suitable wireless network, including cellular networks or a combination of cellular and WLAN networks, Bluetooth tethering, Mobile Hotspot networks, and wireless networks using a Universal Serial Bus (USB) device, to name a few examples.

Conventional secured website credentials, such as Captive Portal or Hotspot credentials, may be stored in the application layer. It may be desirable to store the credentials in network settings, which are not typically stored at the application layer and may be more secure. Network settings may be in a network layer (e.g. Open Systems Interconnection (OSI) model Level 3) or link layer (OSI Level 2) storage space. For example, in some embodiments, the credentials are stored as part of a WLAN profile. Network settings may enable/disable certain functionalities of the network (e.g. allow only certain frequency bands). Network settings may be stored within a secure space or database (e.g. Secured Network Settings) on the device. The term "secure space" herein refers to a storage location on the device that is not accessible on a secured device. The term "secured device" refers to a device that is hardware and software protected from super-user access. For example, a secure space may include a file with super-user or root ownership and location on the device.

FIG. 1 is a flow chart of a method in an electronic device for facilitating authentication to a website according to some embodiments. The method may be performed by an electronic device, for example. The electronic device may be a mobile device, a vehicle or a device in a vehicle, or another portable electronic device for example. The website may be a Captive Portal or Hotspot landing page. However, the method may also be used to facilitate authentication to other types of websites including, but not limited to bank websites, enterprise websites, or any other website that requires credentials for authorization. The website may be a "secured" website, although embodiments are not limited to secured websites. The term "secure website" is used to denote a website that uses Hypertext Transfer Protocol (HTTP) Secure (HTTPS) protocol, which may also be called HTTP over Transport Layer Security (TLS), HTTP over Secure Sockets Layer (SSL). HTTPS websites may require authentication of the device using credentials and may provide protection of the privacy and integrity of exchanged data.

At block 102, credentials for the website are obtained. In this example, the website is a secured website. However, in other embodiments the website may not be a secured website. The secured website may be a Captive Portal or Hotspot landing page, for example. Obtaining the credentials may include receiving the credentials as user input, for example. The credentials may be also obtained from a transmission received at the electronic device. For example, the credentials may be pushed to the electronic device. In some embodiments, a WLAN profile including the credentials is pushed to the device via an Information Technology (IT) policies mechanism for Enterprise WLAN networks. As yet another option, the credentials may be generated at an electronic device.

At block 104, the credentials are stored in a network settings space on the electronic device. The network settings space may be a secured space on the device, as explained above. In some embodiments, the credentials are stored within a WLAN profile in the network settings space. In some embodiments, the WLAN network is an open WLAN network and the secured website is a Captive Portal landing page or a Hotspot landing page. In such cases, the credentials may be stored in the security fields of the WLAN profile for the open WLAN network. The credentials may include a username and password for the landing page.

A network settings space on the device may not be accessible by some applications including the browser application. A network manager service, such as a Wi-Fi manager, may typically include an API having access to the network settings. Thus, the network settings may be more secure than settings and data saved as browser application data. An API for controlling storage and use of the credentials, such as a Captive Portal API, may be integrated into the network manager service, or the API may be external to the network manager service.

WLAN networks with Captive Portal or Hotspot infrastructure are typically open and do not require a WLAN network security method (e.g. a "guest" network in a business location or a network at a public location such as an airport). Therefore the WLAN security fields in the WLAN profile saved on the electronic device for that network may be empty. Some example Wi-Fi network security fields include WEP or WPA security fields. Thus, for an open WLAN network, the WEP, WPA or WPA2 security fields may be available to store the Captive Portal or Hotspot credentials. In Android™ devices, WPA security fields may be saved in the file "wpa_supplicant.conf". This file may be stored in a secure settings space of the device (such as the example secure and systems storage space 575 shown in FIG. 5).

WEP and WPA/WPA2 (aka personal security) may have only one security field in a WLAN profile, which may be the authentication key required by the IEEE 802.11 security standard. For an open Wi-Fi network, this one field can be used to store a first website credential (e.g. password). Another field may be added to the same WLAN profile to store a second website credential (e.g. username). The resulting WLAN profile may be considered a pseudo-enterprise WLAN profile with the difference that the security fields (storing first and second website credentials) saved under this WLAN profile are for application layer authentication and not for Wi-Fi network layer authentication.

In another embodiment, if the device is connected to a secured WLAN then the WLAN profile may store both layer2 security credentials for Wi-Fi authentication and the website credentials in additional fields inside the same WLAN profile. Thus, credentials for a website, such as a secured website, may be stored in a WLAN profile for a WLAN network even if the WLAN network is not open. The secured WLAN network may be, for example, a WEP or WPA secured network (e.g. a personal network) or an EAP-TLS secured network (e.g. enterprise network).

Figure 2:
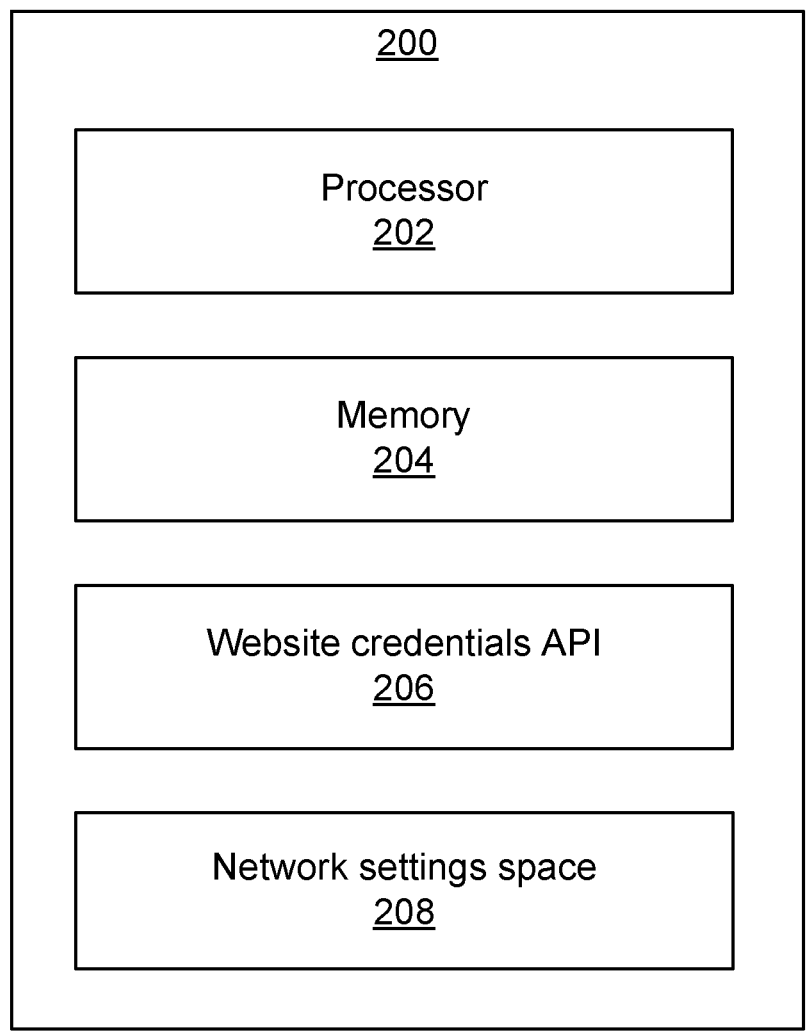
FIG. 2 is a block diagram of an example electronic device that may implement the method of FIG. 1.

FIG. 2 is a block diagram of an electronic device 200, according to one embodiment, that may implement the method of FIG. 1. The electronic device 200 may be a mobile device, a device in a vehicle, or another portable electronic device for example. The electronic device 200 in this example includes a processor 202, a memory 204 coupled to the processor 202, a website credential API 206, and network settings space 208. The electronic device 200 is wireless capable and may include additional components that are not shown such as a transmitter, a receiver and/or a transceiver. The term "website credential API" is used herein to describe any API that manages website credentials as described above or below. For example, the website credential API may be a Captive Portal API in some embodiments. The term "website credential API" is not intended to limit the API to only performing functions relating to website credential management. The website credential API may also perform additional functions.

The network settings space 208 stores network settings, such as WLAN profiles. The network settings space 208 may be located in memory 204. The network settings space 208 may not be accessible by a browser application of the device. The network settings space 208 may store a WLAN profile for an open Wi-Fi network that has Captive Portal or Hotspot capability. WLAN profiles for non-open, secured networks (such as enterprise or personal networks) may also be stored in the network settings space 208. The WLAN profiles may include credentials for one or more websites (e.g. secured websites) including, but not limited to, a Captive Portal or Hotspot landing page as discussed herein. Credentials for any website requiring authentication may be stored in the network settings space 208.

The website credential API 206 has access to the network settings, including any WLAN profiles. The website credential API 206 obtains credentials for a secured website and stores the credentials in the network settings. For example, if the secured website is a Captive Portal landing page used to obtain access to the open Wi-Fi network, the website credential API 206 obtains credentials (e.g. user name and/or password) for logging into the landing page and stores the credentials in the WLAN profile for the open Wi-Fi network. The website credential API 206 may be, or include, an API. For example, in a Captive Portal embodiment, the website credential API 206 may be a Captive API that manages the Captive Portal functionality of the device.

The website credential API 206 may be implemented as hardware, software or a combination thereof. For example, the website credential API 206 may be implemented as a processor (such as the processor 202) configured to perform the functions described above. The website credential API 206 may alternatively be implemented with memory (such as the memory 204) containing instructions for execution by a processor (such as the processor 202).

As discussed above, a user may conventionally need to log in to a Captive Portal or Hotspot landing page multiple times. For example, a Captive Portal or Hotspot authentication may expire, or the electronic device may leave the Captive Portal or Hotspot network. In such circumstances, re-log in to the Captive Portal or Hotspot landing page is typically required. In some embodiments, without user interaction, the credentials may be automatically retrieved from the network settings stored on the device and/or forwarded to the secured webpage for authentication of the device. This automatic authentication/login process may facilitate seamless connectivity for the user.

An example WLAN profile structure including Captive Portal or Hotspot credentials stored in the WPA security fields "identity" and "password" is shown below.

```
network={
    ssid="Network Name"
    key_mgmt=NONE
    identity="Captive Portal or Hotspot username"
    password="Captive Portal or Hotspot password"
    sim_num=1
    priority=35
}
```

The "ssid" field stores the Service Set Identifier (SSID) for the network. The example SSID "Network Name" is used generically herein and is not intended to limit the network to any particular SSID. The "key_mgmt" field identifies the type of WPA key management, if any. The "sim_num" field identifies which SIM to use in multi-SIM devices. The field "priority" sets a priority of the network. A person skilled in the art will appreciate that the particular entries for the fields "ssid", "key_mgmt", "sim_num" and "priority" shown above are exemplary and are not intended to limit embodiments to any particular entries for said fields.

Alternatively, new or different field descriptions for Captive Portal or Hotspot credentials could be created in the file storing WLAN profiles (e.g. wpa_supplicant.conf file). An example WLAN profile structure of Captive Portal or Hotspot credentials stored in place of WPA security fields, with modified field descriptions is shown below. In particular, the field descriptions "Hotspot_identity" and "Hotspot_password" are used instead of conventional WPA security field descriptions "identity" and "password".

```
network={
    ssid="Network Name"
    key_mgmt=NONE
    Hotspot_identity="Captive Portal or Hotspot username"
    Hotspot_password="Captive Portal or Hotspot password"
    sim_num=1
    priority=35
}
```

The secured webpage may be associated with a particular WLAN network, as in the case of a Captive Portal or Hotspot landing page for an open WLAN network. The electronic device may save the credentials along with the SSID of the associated network within the corresponding WLAN profile. For example, the network may be an open Wi-Fi network, and the SSID for the Wi-Fi network may be stored in the WLAN profile for that network, together with the user name and/or password for the Captive Portal.

In some embodiments, an Information Technology (IT) policy for an enterprise may be enforced and limit the opening of the secured websites by using only approved WLAN networks. For example, a corporate patent dataset could only be opened using a corporate environment Wi-Fi network with a unique network name (SSID).

In some embodiments, a Uniform Resource Locator (URL) of a secured website is stored in one or more WLAN profiles, possibly together with the credentials for the secured website. An electronic device may detect a secured website URL when connecting to a network (such as a Captive Portal landing page when connected to an open WLAN network). Before submitting stored credentials for authentication, the device may check the detected URL with the URL stored in the WLAN profile. The credentials may, thus, be protected from phishing web authentication pages. An example WLAN profile structure including a URL for an example Captive Portal landing page <https://caoporate.captive-portal.net/login> as well as the Captive Portal credentials is shown below, although embodiments are not limited to this particular profile structure.

```
network={
    ssid="Network Name"
    key_mgmt=NONE
    identity= "Captive Portal/Hotspot username"
    password= "Captive Portal/Hotspot password"
    Captive Portal/Hotspot_URL: https://caoporate.captive-portal.net/login
}
```

As discussed above, the secured website is not limited to Captive Portal or Hotspot landing pages. For example, other authentication webpages where credentials are needed may be used including, but not limited to, banking websites; enterprise websites; educational institution websites; etc. In some embodiments, the WLAN profiles will also store/save WLAN network credentials along with the secured website credentials and URL. In some embodiments, when the electronic device is connected to a WLAN Access Point identified in the WLAN profile (e.g., home-network) and the user opens a secured web site that matches the URL stored in the WLAN profile, the device will trigger the login automatically by forwarding the credentials stored in WLAN profile to the network. This functionality may be performed by an API (e.g. Captive Portal API) or other service component in the WLAN subsystem of the device that has access to the network settings.

One or more URLs may be stored and associated with an individual WLAN network using a "single-WLAN" profile structure. An example of a single-WLAN profile structure is shown below, although embodiments are not limited to this particular profile structure. The WLAN profile has the example URLs <https://cibc.com/login> and <https://bmo.com/login> and credentials (user name and password) associated with an example "home" network.

```
network={
    ssid=home-network
    key_mgmt=WPA2
    password=mypass
    secureURL1: https://cibc.com/login
        secure-username: bank-car-number
        secure-password: bank-password
    secureURL2: https://bmo.com/login
        secure-username: bank-car-number
        secure-password: bank-password
}
```

One or more URLs may be stored associated with multiple WLAN profiles collectively using a "multiple-WLAN"

profile structure. In this structure, multiple WLAN profiles can share the same secured website information including one or more URLs and credentials. As an example, user may wish to log into a secured webpage through a first Wi-Fi network with a first SSID and Wi-Fi authentication information (e.g. home network) and through a second Wi-Fi network with a different SSID and different Wi-Fi authentication information (e.g. office network). The URL and webpage credentials may be stored in association with both Wi-Fi networks using the multiple-WLAN profile structure. One example of a multiple WLAN profiles structure is shown below, although embodiments are not limited to this particular profile structure. The example WLAN profile below has the example URLs <https://cibc.com/login> and <https://bmo.com/login> and credentials (user name and password) associated with example "home" and "office" networks.

```
Network={
    ssid=home-network
    key_mgmt=WPA2
    password=mypass
    secured_websites_info=Yes
    ssid=office-network
    key_mgmt=WPA2
    identity=office_user_name
    password=office_wifi_password
    secured_websites_info=Yes
    }
secured_websites_info={
secureURL1: www cibc.com/login
        secure-username: bank-card-number
        secure-password: bank-password
secureURL2: www bmo.com/login
        secure-username: bank-card-number
        secure-password: bank-password
}
```

By storing URL information in connection with one or more WLAN profiles, the user of the device may be able to automatically log in to a secured webpage from one or more trusted networks, but still be protected from sending the website credentials on un-known and/or untrusted Wi-Fi networks. For example, the user may change, manage or control settings to limit the banking experience to only some particular/trusted Wi-Fi networks (such as home or office networks), thereby preventing banking credentials from being automatically forwarded on other networks (such as a public, open network).

Some aspects of the disclosure implement a systemized and segregated method of storing website credentials. Certain credentials may be shared between profiles for multiple WLAN networks, while other credentials may be restricted to only a particular WLAN network. For example, an "airport" WLAN network profile may not be permitted to store credentials for a corporate/enterprise website. That WLAN network profile may only store the credentials required for "airport" Hotspot network access. Similarly, credentials for a corporate website may be stored only in the WLAN profile for a particular enterprise WLAN network, and the credentials may not be shareable with any personal (e.g. home) network profile. Thus, the corporate website may only be accessed using the particular enterprise WLAN network. This segregation and/or sharing of credentials between network profiles may be achieved, for example, using a flag for each set of stored credentials in the WLAN profile(s), where the flag indicates that the credentials are either allowed to be shared or prevented from being shared. The user may provide input designating whether credentials for a particular website are shareable or not with other WLAN profiles. For example, the user may be prompted or asked for input (e.g. before the credentials are saved) or the user may edit this flag setting manually. This flag may also be set when an enterprise WLAN profile is sent to the device by an IT policy and this profile contains credentials for corporate secured websites.

Figure 3:
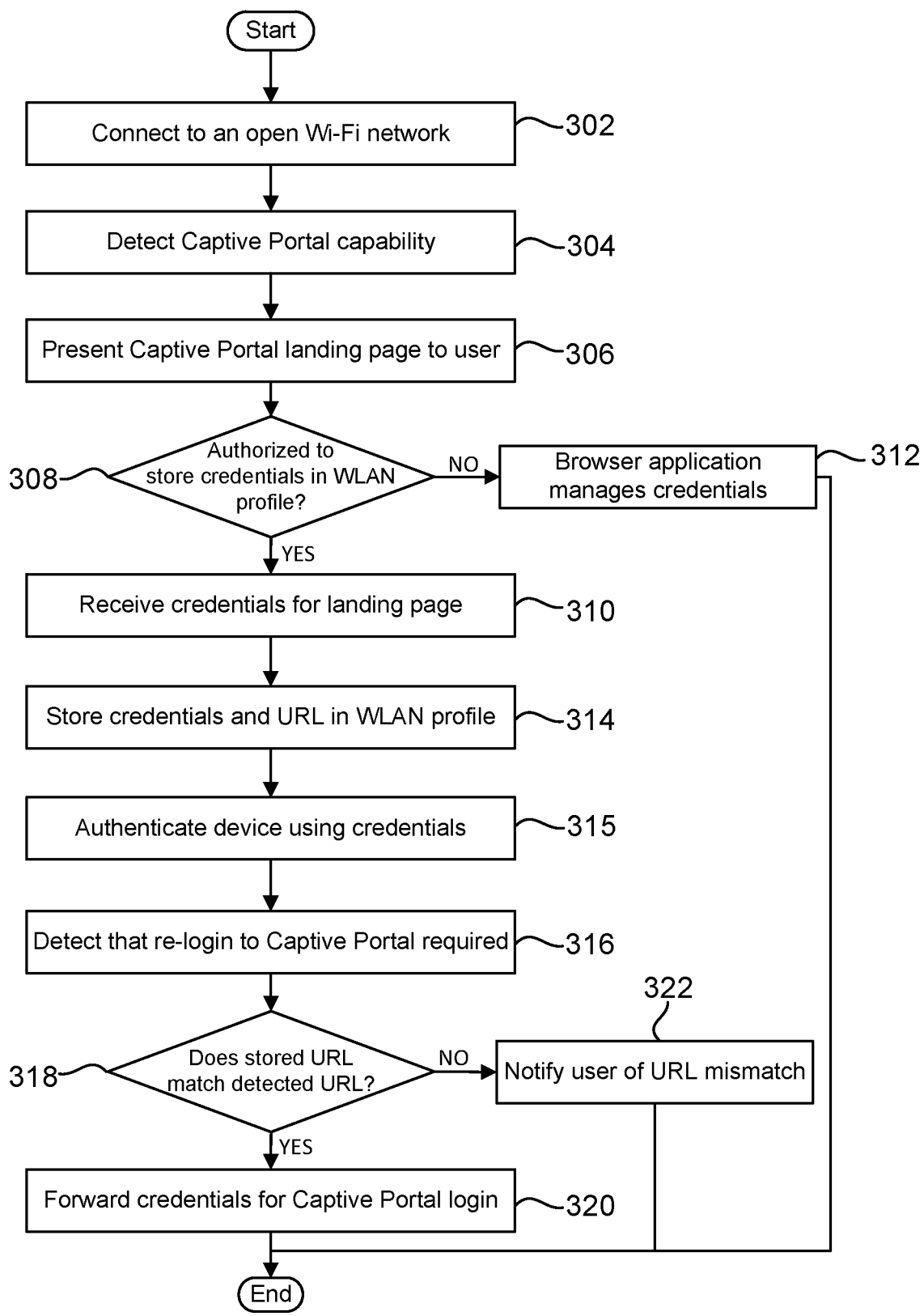
FIG. 3 is a flowchart of a method at an electronic device for facilitating authentication on a secured website according to another embodiment.

FIG. 3 is a flowchart of a method at an electronic device for facilitating authentication on a secured website according to another embodiment. The electronic device may be a mobile device, a vehicle or a device in a vehicle, or another portable electronic device for example. The functions relating to managing the Captive Portal functionality on the device are performed by a Captive Portal API (functioning as a website credential API) in this embodiment.

At block 302, the electronic device connects to an open Wi-Fi network (for the first time in this example) and creates a WLAN profile for the network. No pre-existing profile for the network is saved on the device before the initial connection in this example. The method may also include checking the network settings in the device to determine whether a WLAN profile for the network already exists before creating the new WLAN profile.

At block 304, the Captive Portal API detects that the network supports a Captive Portal infrastructure and detects a URL for a Captive Portal landing page. The method may also include checking WLAN profiles already saved on the device for saved credentials and/or a URL for the landing page. In this particular example, no pre-existing credentials are saved on the device.

At block 306, the Captive Portal lading page is presented to the user of the electronic device for entry of credentials. Presentation of the landing page may include receipt of the landing page from the network.

When received from the network, the landing page may be displayed by a browser application on the device, at the direction of the Captive Portal API for example. The credentials include a username and password for the Captive Portal landing page in this example.

At block 308, authorization to store the Captive Portal credentials in the WLAN profile for the Captive Portal Wi-Fi network is requested from the user. For example, the Captive Portal API may cause the electronic device display an interface with option to allow or deny the Captive Portal credentials to be saved in the WLAN profile. In some embodiments, this request for authorization may be presented to the user before the credentials are input.

If the user provides input indicating that storage in the WLAN profile is allowed (yes branch, block 308) then the method continues at block 310, and the credentials for the Captive Portal Wi-Fi landing page are received as user input. The user may input the credentials into the landing page, and the device may save a copy of those credentials, as entered. Alternatively, the device may open the WLAN profile and provide an interface to the user for entry of the credentials into the profile. The interface may, for example, include the example dialog boxes shown in FIG. 9A or 9B and discussed below. The method then continues at block 314.

Optionally, rather than receiving website credentials as user input, the credentials may be obtained by receiving a transmission, generating the credentials at the electronic device, or by other means in other embodiments. Thus, in other embodiments, it may not be necessary for the user to input the credentials. In some embodiments, authorization from the user to store the credentials may also not be needed. For example, if credentials for an enterprise website are pushed to the device, the device may automatically store the credentials in the network settings space on the device (e.g. in a WLAN profile for an enterprise network).

Turning back to block 308, if the user provides input indicating that storage in the WLAN profile is not allowed (no branch, block 310), then the credentials for the webpage will be managed entirely by the browser application at block 312. The browser application managing the credentials may comprise the browser application receiving and storing the credentials within the data storage area of the browser application.

At block 314 the Captive Portal API stores the credentials and the URL for the Captive Portal landing page in the WLAN profile. More specifically, the credentials are saved in the WPA security fields of the WLAN profile.

At block 315, the device is authenticated using the Captive Portal credentials. In this example, the authentication includes forwarding the credentials with a login request (via the Wi-Fi network) to the designated network component. For example, the credentials may be forwarded to an authentication server for the Captive Portal infrastructure. The Captive Portal landing page may also require the user to agree to certain terms and/or conditions, in which case user input agreeing or not agreeing with said terms and/or conditions may be received as well.

In some embodiments, the authentication server is within the same network as the device. This may be the case, for example, for a home WLAN network or open WLAN Network using Captive Portal or Hotspot (e.g. library, airport, coffee shops, etc.) and enterprise/corporate WLAN network, and in particular Hotspot and Captive Portals landing pages accessed via an open Wi-Fi network. Alternatively, in other embodiments, the authentication server is on a different network than the device. This may be the case, for example, when device accesses a secured website on the internet or on an intranet (e.g. for corporate/enterprise services) using non-open network technology, such as an encrypted Wi-Fi network, a cellular network, etc.

At block 316, the Captive Portal API detects that re-authentication for the Captive Portal is required. For example, the authentication may have expired to a timeout or the device may have disconnected from the Wi-Fi network and then reconnected to the network. A user may also manually trigger the re-connection and/or re-authentication process. Detecting that re-authentication is required, in this example, includes again detecting the Captive Portal landing page URL for the Wi-Fi network.

At block 318, the Captive Portal API checks detected URL with the URL stored in the WLAN profile for the Wi-Fi network. If the detected URL matches the stored URL (yes branch, block 318), then at block 320 the device is automatically authenticated using the credentials. This authentication may include retrieval of the credentials from the WLAN profile and forwarding the credentials to the relevant network component (e.g. authentication server) for login to the website. The credentials may be forwarded with an authentication or login request. Thus, the method may facilitate seamless connectivity for the user. The user may still be required, through the browser, to agree to terms, conditions and/or disclaimers before being granted full access to the Wi-Fi network. The automatic login/authentication procedure (including at least blocks 315, 316, 318 and 320) may be repeated as needed. For example, the authentication may timeout multiple time, or the user may disconnect from the network (e.g. due to roaming or temporarily disabling wireless capabilities on the electronic device).

If the detected URL does not match the stored URL (no branch, block 316), then the user is notified of a mismatch at block 322. For example, an alert may be displayed on the device. The alert may notify the user of a possible phishing attempt.

As discussed above, embodiments are not limited to a Captive Portal or Hotspot website for an open WLAN network. Credentials for other websites may be stored in network settings, and the credentials may be stored in association with secure, non-open networks, and non-WLAN networks (e.g. cellular networks). For example, in some embodiments, if a device navigates to a remote website on the internet either using a Wi-Fi or cellular networks (or other types), the website may be hosted remotely on the webservers offering internet online services. Such websites may include a bank website or an email login page. For example, in an enterprise WLAN network, the network component hosting the Captive Portal may be a local WLAN network controller (e.g. Cisco™, Aruba™, or Meru™ wireless controllers), which may manage a multitude of access points deployed thought one or more buildings. Captive Portal capability may be enabled as an authentication service for a particular SSID similar to other enterprise authentication types, such as Extensible Authentication Protocol Transport Layer Security (EAP-TLS). The landing page may be hosted in the WLAN controller and may be customized by the network administrator and presented to the device users each time they access a particular Wi-Fi network inside the corporate building. In other embodiments, the website requiring the credentials may be hosted by an authentication server. For a personal Wi-Fi network or Hotspot, the network component may be a network access point that is hosting a local webserver that offers authentication and authorization services (e.g. an open source Apache™ webserver).

Figure 4:
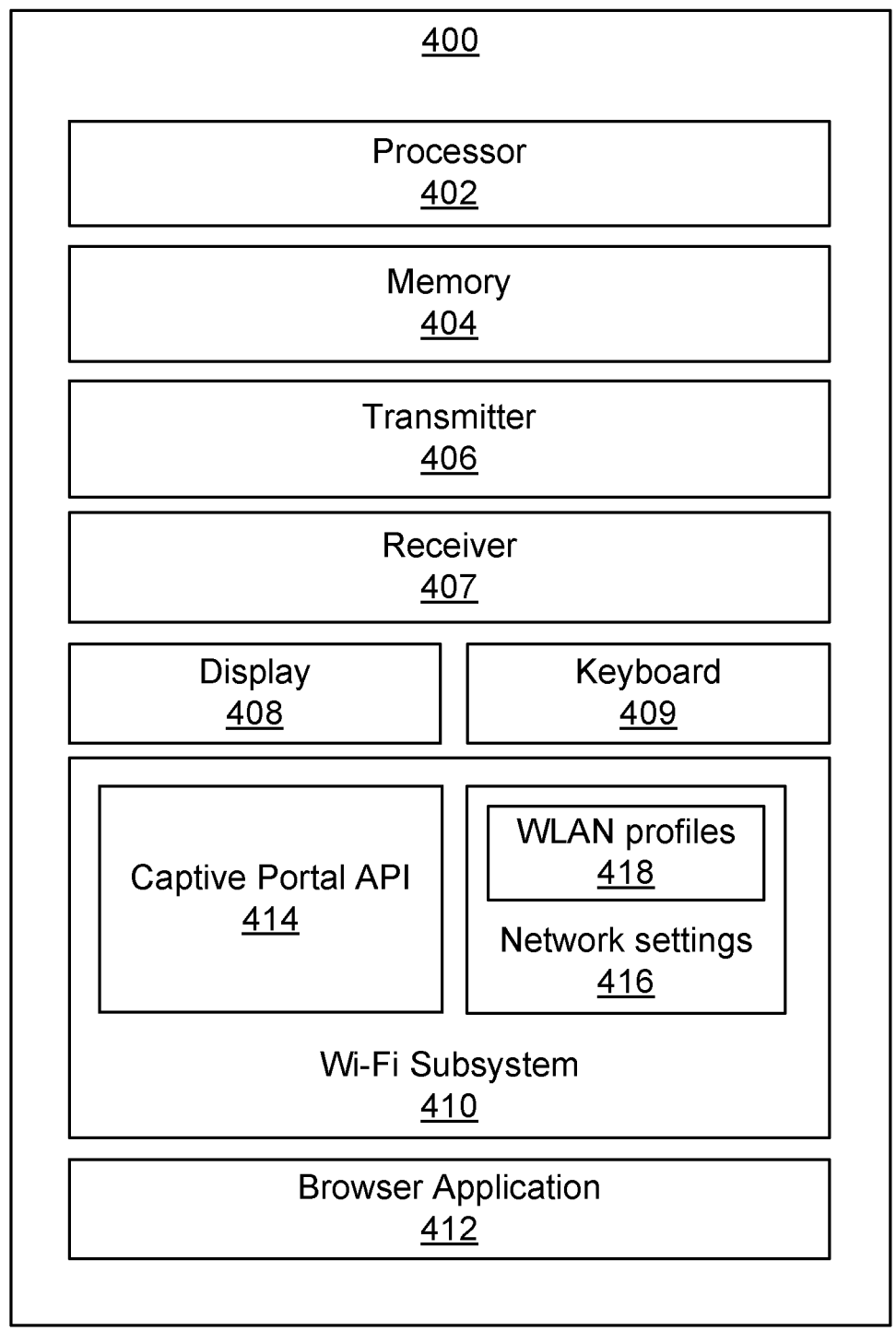
FIG. 4 is a block diagram of an example electronic device that may implement the method of FIG. 3.

FIG. 4 is a block diagram of an electronic device 400, according to one embodiment, that may implement the method of FIG. 3. The electronic device 400 may be a mobile device, a device in a vehicle, or another portable electronic device for example. The electronic device 400 is wireless communication capable. The electronic device 400 in this example includes a processor 402, a memory 404 coupled to the processor 402, a transmitter 406, a receiver 407, a display 408, a keyboard 409 and Wi-Fi subsystem 410. The Wi-Fi subsystem 410 includes a Captive Portal API 414 and network settings space 416. The Captive Portal API 414 manages secured website credentials and authentication functions as explained below.

The network settings space 416 stores network settings, including WLAN profiles. The network settings space 416 may be located in the memory 404. The network settings space 416 may be a secure storage space in the memory 404 that is not accessible by the browser application 412.

The Wi-Fi subsystem 410 may include other components not shown in FIG. 4. The electronic device 400 also includes a browser application 412. The browser application 412 is shown external to the Wi-Fi subsystem 410, but it is to be understood that the browser application may also be within the Wi-Fi subsystem 410 in other embodiments.

In FIG. 4, the Captive Portal API 414 manages the Captive Portal functionality of the electronic device, and thereby functions as a website credential API. The Captive Portal API 414 detects when the electronic device has connected to an open WLAN network using a Captive Portal landing page. The Captive Portal API 414 detects the landing page URL and, if no credentials for the landing page are stored on the device, the browser application 412 presents the landing page to the user on the display 408. Upon entry of the credentials, the Captive Portal API 414 forwards the credentials to an authentication server (not shown) for the Captive Portal landing page to obtain authentication for the Wi-Fi network. The Captive Portal API 414 also requests authorization (e.g. via a prompt displayed on the display 408) for the credentials to be stored in the network settings 416, as so stores the credentials and the URL in the WLAN profiles 418 if authorized to do so. If not authorized, the Captive Portal API 414 may store the credentials in the browser application 412 storage. If re-authentication/re-log in to the Captive Portal is required, the Captive Portal API 414 retrieves the credentials from WLAN profiles 418 and automatically performs login to the Captive Portal, as described above.

The Wi-Fi subsystem 410 in FIG. 4 may be implemented as hardware, software or a combination thereof. For example, the Wi-Fi subsystem 410 may be implemented with the processor 402 and/or the memory 404.

Embodiments are not limited to API's that are specific for Captive Portal management only. Furthermore, the API managing website credentials may not be internal to a Wi-Fi subsystem, in some embodiments, and may also manage website credentials for authentication on a non-WLAN network (e.g. cellular network).

Figure 5:
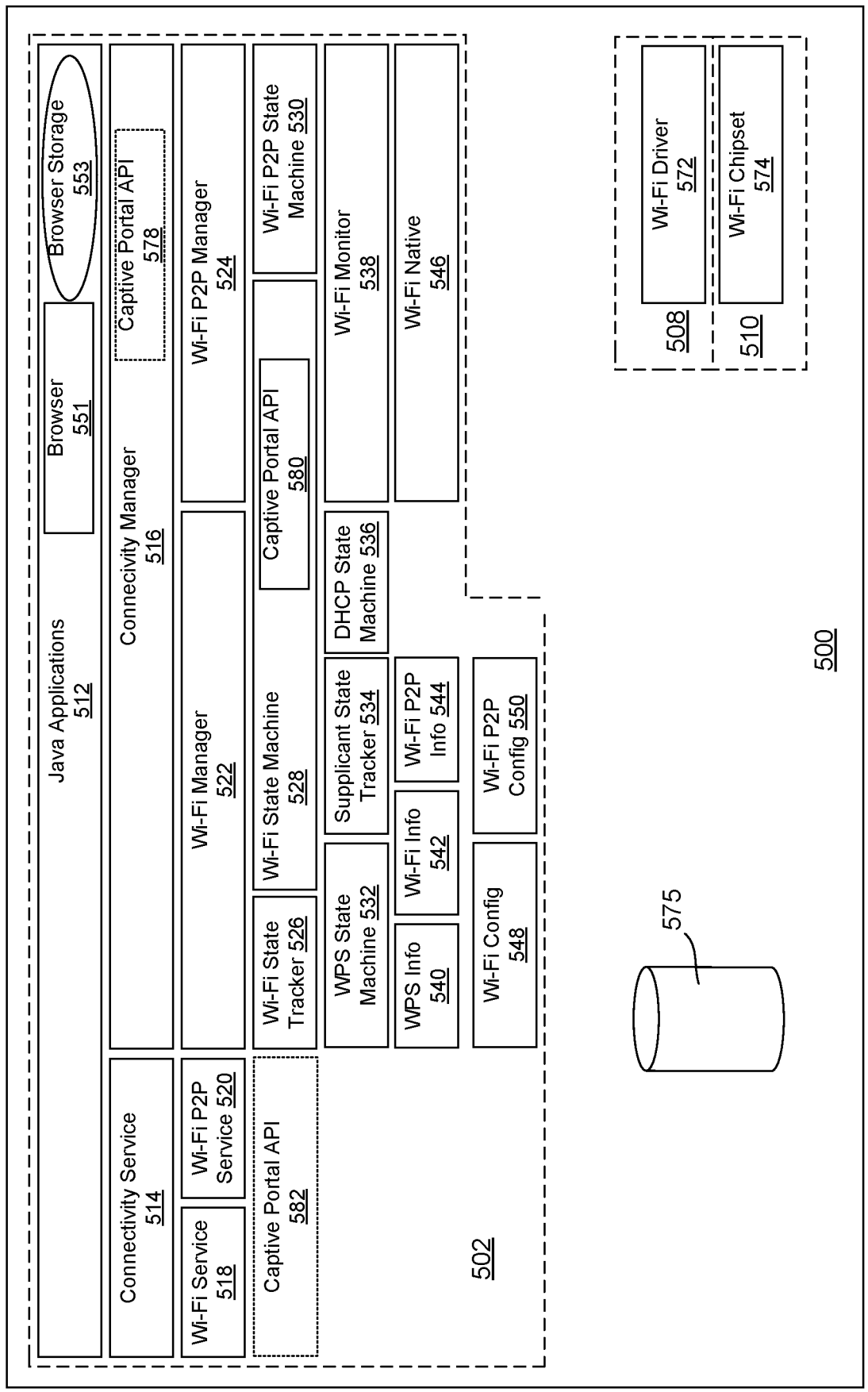
FIG. 5 is a block diagram of an example Wi-Fi subsystem.

FIG. 5 is a block diagram of an example Wi-Fi subsystem 500 that may be used implemented in an electronic device (such as the electronic devices 200 and 400 of FIGS. 2 and 4). The various blocks in FIG. 5 are arranged as a protocol stack. However, embodiments are not limited to the particular arrangement shown in FIG. 5, and various components not shown in FIG. 5 may be included, and some components shown in FIG. 5 may be excluded in other embodiments.

The structure of the Wi-Fi subsystem 500 shown in FIG. 5 is generally divided into the following layers: Java framework and applications layer 502; kernel drivers layer 508; and hardware layer 510. A person skilled in the art will appreciate that the Wi-Fi subsystem may also include other layers, such as a device specific Hardware Abstraction Layer (not shown) and a core systems library layer (not shown) that may both include additional components not shown in FIG. 5. An example diagram of layers and components of a conventional Android Wi-Fi subsystem protocol stack may be found online at: <https://source.android.com/devices/> or <https://developerandroid.com/reference/packages.html>.

The Java framework and applications layer 502 includes the following components: Java applications 512; connectivity service 514; connectivity manager 516; Wi-Fi service 518; Wi-Fi Peer-to-Peer (P2P) service 520; Wi-Fi Manager 522; Wi-Fi P2P manager 524; Wi-Fi state tracker 526; Wi-Fi state machine 528; Wi-Fi P2P state machine 530; Wi-Fi Protected Setup (WPS) state machine 532; Supplicant state tracker 534; Dynamic Host Configuration Protocol (DHCP) state machine 536; Wi-Fi monitor 538; WPS info 540; Wi-Fi info 542; Wi-Fi P2P info 544; Wi-Fi Native 546; Wi-Fi Config 548; and Wi-Fi P2P Config 552. A browser application 551 and a browser data storage space 553 is included in the Java applications 512.

The Kernel Drives layer includes the following components: NL80211 component 570; and Wi-Fi Driver 572.

The hardware layer 574 includes a Wi-Fi chipset.

The Wi-Fi subsystem 500 also includes a storage space 575 for secure and system settings. The secure and system settings storage space 575 is a memory storage that stores network settings, including WLAN profiles. Website credentials may be stored in the secure and system settings storage space 575, for example in the WLAN profiles. In some embodiments, the storage space 575 stores the wpa_supplicant.conf file located in a secure folder (e.g. the /data/misc/wifi secure folder) on the device. Browser applications may not be able to open this file. Rather, only Wi-Fi software components (e.g. WPA supplicant) may have access to the file. The secure and system settings storage space 575 is only accessible by certain components. For example, the Wi-Fi manager 522 has access to the secure and system settings storage space 575, but the Java applications 512, including browser application 551, do not have access to the secure and system settings storage space 575.

In a conventional Wi-Fi subsystem, a conventional Captive Portal API (indicated by stippled line block 578) may located within the connectivity manager 516. The conventional Captive Portal API 578 may allow the browser application 551 handle the credentials for a Captive Portal webpage, and the browser application 551 may store the credentials in a data storage space 576 within the Java applications block 512.

The Captive Portal API 580 according to some embodiments of the present disclosure, however, may be within the Wi-Fi manager 522, which has access to the WLAN profiles in the secure and system settings storage space 575. Thus, the Captive Portal API 580 can store credentials for a Captive Portal landing page in the WLAN profile for the corresponding Wi-Fi network, as described above. Alternatively, the Captive Portal API may be external to the Wi-Fi manager 522 and may instead be set up as a distinct and separate service component (as shown in the stippled block 582, with access to the secure and system settings storage space 575. As described above, the Captive Portal API 580 may cause Captive Portal or Hotspot credentials to be stored in the secure and system settings storage space 575. Credentials for other websites requiring authentication may also be stored in the secure and system settings storage space as described above. Such credentials may be associated (e.g. in one or more WLAN profile) with one or more networks.

Figure 6:
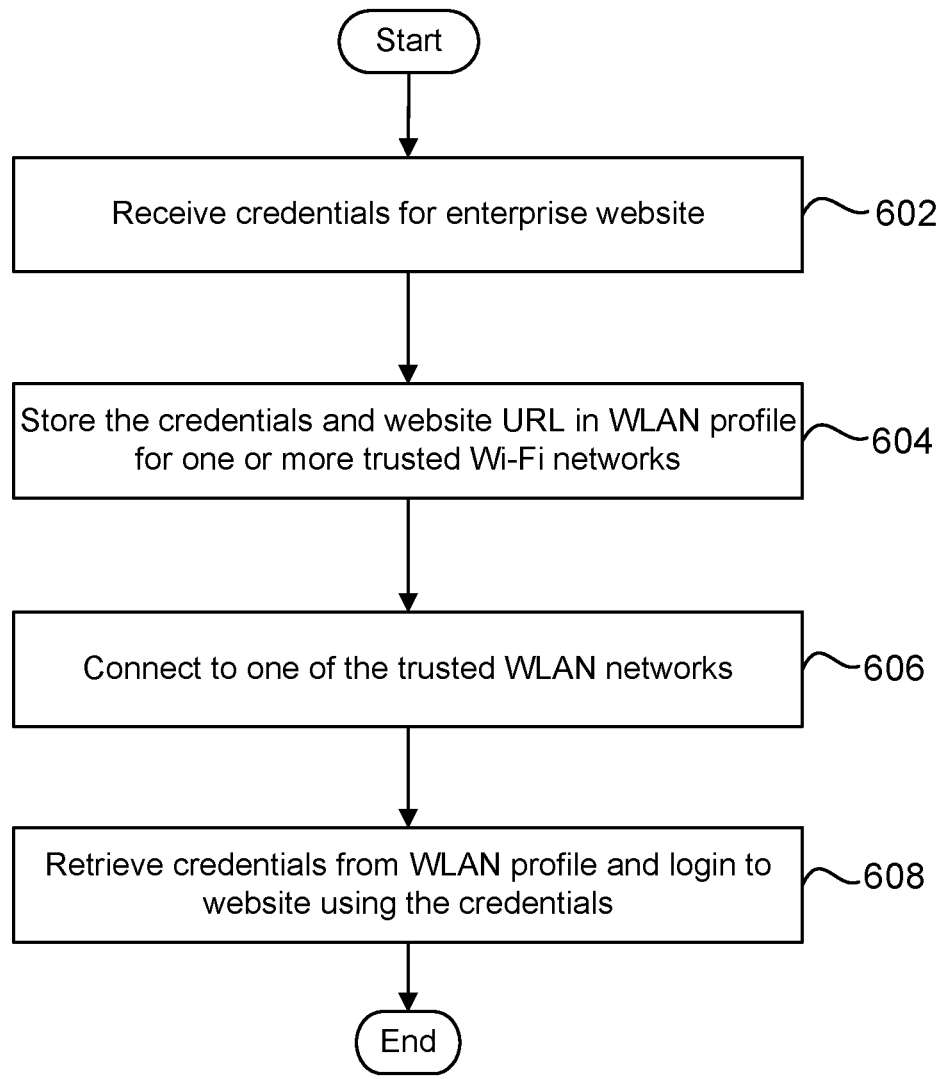
FIG. 6 is a flow chart of a method in an electronic device for facilitating authentication to a website, according to another embodiment.

FIG. 6 is a flowchart of another example method at an electronic device for facilitating authentication on a website in an enterprise environment, such as a corporate environment. The electronic device may be a mobile device, a vehicle or a device in a vehicle, or another portable electronic device for example. As explained, however, embodiments are not limited to any particular website or to a particular wireless network type.

At block 602, the device receives a wireless transmission containing credentials and a URL for an enterprise website (such as a secured office webpage). The transmission may be an IT profile, or other message pushed to the device. The transmission may also include an indication of one or more trusted Wi-Fi networks over which the device is authorized to log in to the website. The one or more trusted networks may include an enterprise network (e.g. secured office network). The one or more trusted networks may also include a home network. For example, the user may be an employee with a secured home network trusted by the enterprise. The transmission may be received over one of the one or more trusted Wi-Fi networks.

At block 604, the device stores the credentials and URL for the website in the WLAN profile for the one or more trusted Wi-Fi networks. The credentials may be stored in a single-WLAN profile structure (in one or more WLAN profiles). Alternatively, if the user is authorized to access the website from more than one network (e.g. a home network and an office network), then the credentials may be stored in a multiple-WLAN profile structure as described above.

At block 606, the device connects to one of the one or more trusted WLAN networks (e.g. the enterprise network).

At block 608, the device retrieves the credentials from the WLAN profile and logs in to the website with the credentials to authenticate the device. The device may also compare the stored URL with a detected URL for the website before forwarding the credentials, as described above. The authentication may be performed automatically under certain circumstances. For example, the device automatically logs in to the website responsive to the device connecting to the Wi-Fi network. The authentication may also be performed when manually triggered (e.g. while on the home network or when desired on the network). In some embodiments, the website may require manual login at one or more predetermined instances. The user may also need to agree to terms and/or conditions as part of the authentication process (e.g. after the credentials are accepted).

The electronic device 200 of FIG. 2 may implement the method of FIG. 6, with the website credential API 206 managing the credential storage, retrieval, and forwarding functions as described above. As also described above, the website credential API 206 may be a Captive Portal API. The electronic device 400 of FIG. 4 may also implement the method of FIG. 6. For example, the Captive Portal API may be modified to perform the enterprise website authentication functions, or a new API or other module may be included to perform such functions.

Figure 7:
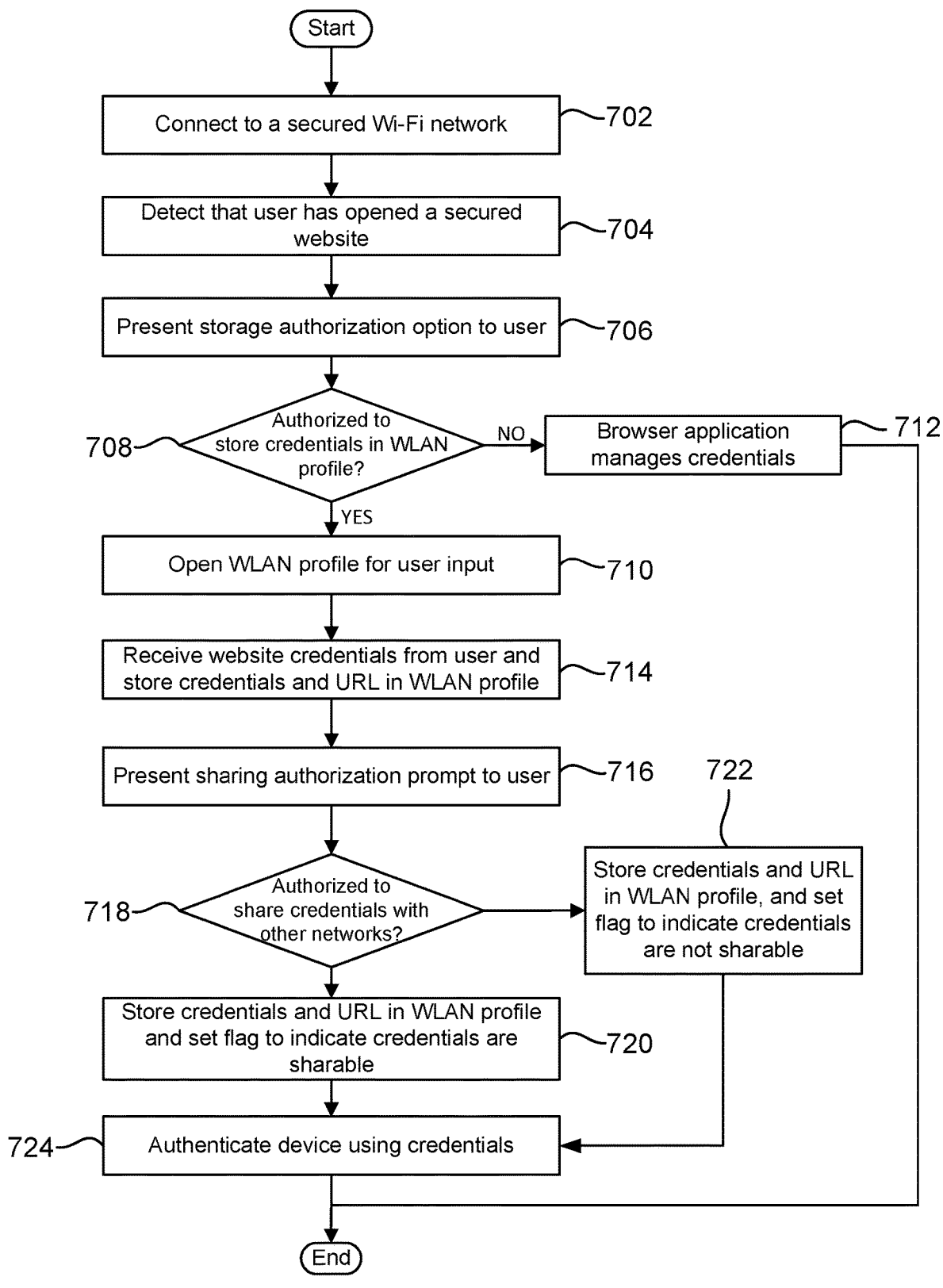
FIG. 7 is a flow chart of a method in an electronic device for facilitating authentication to a website, according to yet another embodiment.

As discussed above, a device may be limited to a particular network for logging into a website using stored credentials, or a device may be permitted to login to a website over more than one network using the stored credentials. When website authentication is permitted over multiple networks (e.g. home and office networks), the credentials may be considered to be "shared" by or "sharable" on the device between the profiles for those networks. FIG. 7 is a flowchart of a method at an electronic device for facilitating authentication on a website according to another embodiment. The electronic device may be a mobile device, a vehicle or a device in a vehicle, or another portable electronic device for example. In the method of FIG. 7, the user may grant or deny permission to share the website credentials for multiple networks. The website credentials may be managed in accordance with the method of FIG. 7 by an API on the device (such as the website credential API 206 on the device 200 of FIG. 2, or the Captive Portal API 414 on the device 400 of FIG. 4).

At block 702, the electronic device connects to a secure, encrypted Wi-Fi network. The network may use WPA, WPA2 or WEP security, for example, although embodiments are not limited to any particular security type. A WLAN profile for the network may already be stored in the device, or the device may create the WLAN profile if the device is connecting to the network for the first time. The method may also include checking the network settings in the device to determine whether a WLAN profile for the network already exists before creating the new WLAN profile.

At block 704, the device detects that the user has opened a website. The website in this example is a secured website, but embodiments are not limited to secured websites only.

The method may optionally include checking network settings (including WLAN profiles) already saved on the device for previously saved credentials and/or a URL for the website. If a WLAN profile for a different network includes the website credentials, the method may include determining whether the website credentials are permitted to be used (i.e. shared) by the secured Wi-Fi network to which the device is connected. This may include checking for a flag indicating that the credentials are sharable. In this example method, no pre-existing credentials are saved on the device. The website may be, for example, a banking website, or any other website for which authentication by credentials is required. If so, the device may simply use the saved credentials to login to the website and not perform the remaining steps set out below.

In this example, the website credentials are not yet stored on the device, and thus, at block 706, an option to permit storage of the website credentials in network settings is provided to the user. In particular, in this example, authorization to store the credentials in a WLAN profile for the secured network is requested. The authorization request may be presented by a dialog box or other prompt displayed on the device. For example, a dialog box similar to the example shown in FIG. 8A may be presented to the user.

At block 708, user input is received providing or denying authorization to save the credentials in the WLAN profile. If the user provides input indicating that storage in the WLAN profile is allowed (yes branch, block 708) then the method continues at block 710, and the WLAN profile is opened (in a user interface) for the user to input the credentials. This step may involve presenting a dialog box showing the WLAN profile details, such as the example dialog boxes 900 or 950 shown in FIGS. 9A and 9B. Any suitable method of allowing input of the credentials into the device may be used. The method then continues at block 714.

If the user provides input indicating that storage of the website credentials in the WLAN profile is not allowed (no branch, block 708), then the credentials for the webpage will be managed entirely by the browser application at block 712. The browser application managing the credentials may comprise the browser application receiving and storing the credentials within the data storage area of the browser application.

At block 714 opens a WLAN profile for the Wi-Fi network, in the network settings space, receives the credentials as user input and stores the credentials and the URL for the Captive Portal landing page in the WLAN profile. Since the Wi-Fi network is a secured network, the WPA or WEP security fields are not available and new fields for the website credentials must be created and/or used.

At block 716, an option to permit sharing of the website credentials for use with other networks is presented to the user. The authorization request may be presented by a dialog box or other prompt displayed on the device. For example, a dialog box similar to the example shown in FIG. 8B may be presented to the user. Alternatively, the user may be presented with the option to specify one or more trusted networks over which the website credentials may be used to login to the website.

At block 718, user input is received providing or denying authorization to share the website credentials for other networks. If the user provides input indicating that the credentials may be shared, (yes branch, block 718) then the method continues at block 720, and the credentials are stored in the WLAN profile and a flag is set in the WLAN profile to indicate that the website credentials are sharable. The flag indicates that the website credentials are not limited to use with the secured Wi-Fi network identified in the WLAN profile, and the website credentials may be used to login to the website over other networks as well. The method then continues at block 724. Optionally, the website credentials may be saved in one or more WLAN profiles associated with one or more other trusted networks (rather than, or in addition to setting a flag).

If the user provides input indicating that storage of the website credentials in the WLAN profile is not allowed (no branch, block 718), then at block 722 the credentials for the webpage will be saved in the WLAN profile for the secured Wi-Fi network (to which the device is currently connected) and the flag is set to indicate that the website credentials are not sharable. Embodiments are not limited to use of a flag to explicitly indicate whether credentials are sharable, and other methods of designating credentials for use with multiple networks may be used.

At block 724, the device is authenticated using the Captive Portal credentials. In this example, the authentication includes forwarding the credentials with a login request (via the Wi-Fi network) to the designated network component.

Although not shown in FIG. 7, the method may further include subsequent re-login to the website, similar to blocks 316 to 322 of FIG. 3. For example, re-login may be required due to a network disconnection or authentication timeout. The device may check the stored network settings for the credentials and determine if the credentials are permitted for use of the current network connection. If the website credentials are permitted for use over the current network connection, the device may then retrieve the website credentials and use them to login to the website. The method may also include checking a URL stored in the WLAN profile to determine that is matches a detected URL of the website (similar to block 318 of FIG. 3).

FIGS. 8A to 9B illustrate examples of graphical user interfaces that may be used to implement some of the concepts described above, according to some embodiments.

Figure 8A:
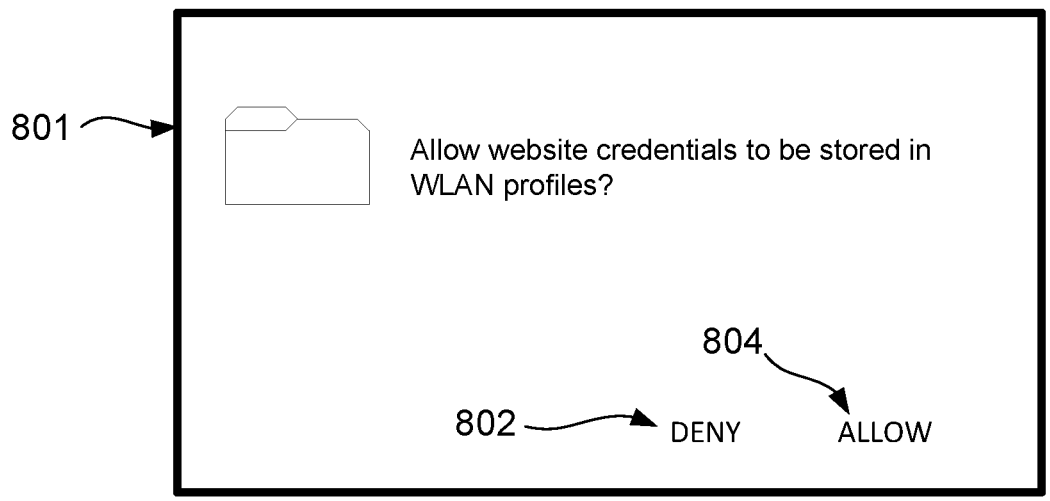
FIGS. 8A and 8B show example user interface dialog boxes for requesting authorization from a user

FIG. 8A is an example user interface dialog box 800 that may be presented to a user to request authorization to store website credentials in a WLAN profile. For example, when an electronic device (such as the electronic device 200 or 400 of FIGS. 2 and 4) connects to an open Wi-Fi Network with Captive Portal or Hotspot capability, the Wi-Fi profile may be automatically created and saved in a WLAN network saved network list (e.g. within secure and system settings). The Captive Portal API may detect the new connected network is Captive Portal or a Hotspot WLAN network infrastructure and may ask the user if they want to store Captive Portal and Hotspot credentials within the WLAN profile, using the dialog box 800 shown in FIG. 8. The dialog box 800 includes a "DENY" button 802 and an "ALLOW" button 804. If the user selects "ALLOW" button 804, the Captive Portal API will open the WLAN profile corresponding to the connected Wi-Fi network for user credentials input.

Figure 8B:
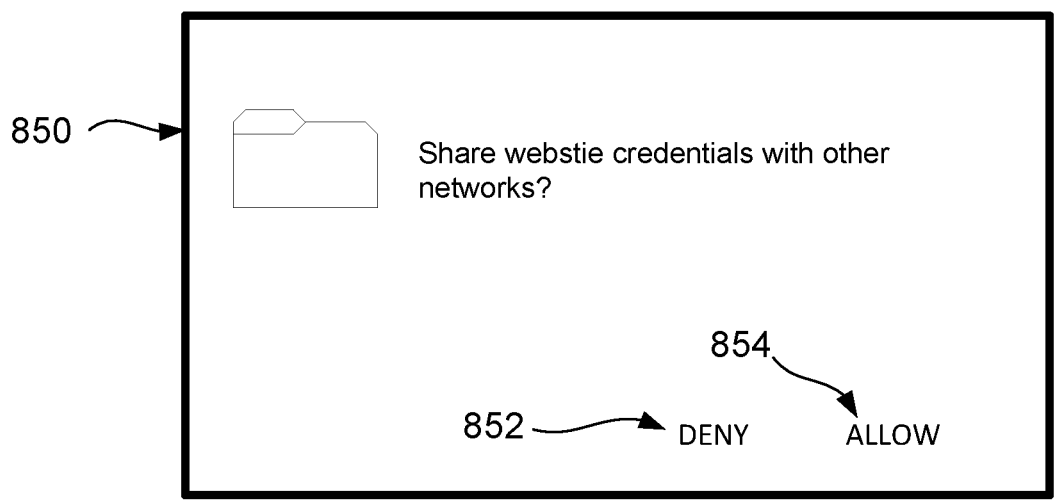

FIG. 8B is an example user interface dialog box 850 that may be presented to a user to request authorization to share the website credentials for use with other networks. For example, when an electronic device (such as the electronic device 200 or 400 of FIGS. 2 and 4) received website credentials (e.g. for a Captive Portal or other secured website), an API may cause the dialog box 850 to be shown to the user to ask if the user wants to enable sharing of the website credentials with other networks. The dialog box 850 includes a "DENY" button 852 and an "ALLOW" button 854. If the user selects "ALLOW" button 854, the API managing website credentials may store the credentials in a WLAN profile with a flag indicating that the credentials are sharable, as described above.

Figure 9A:
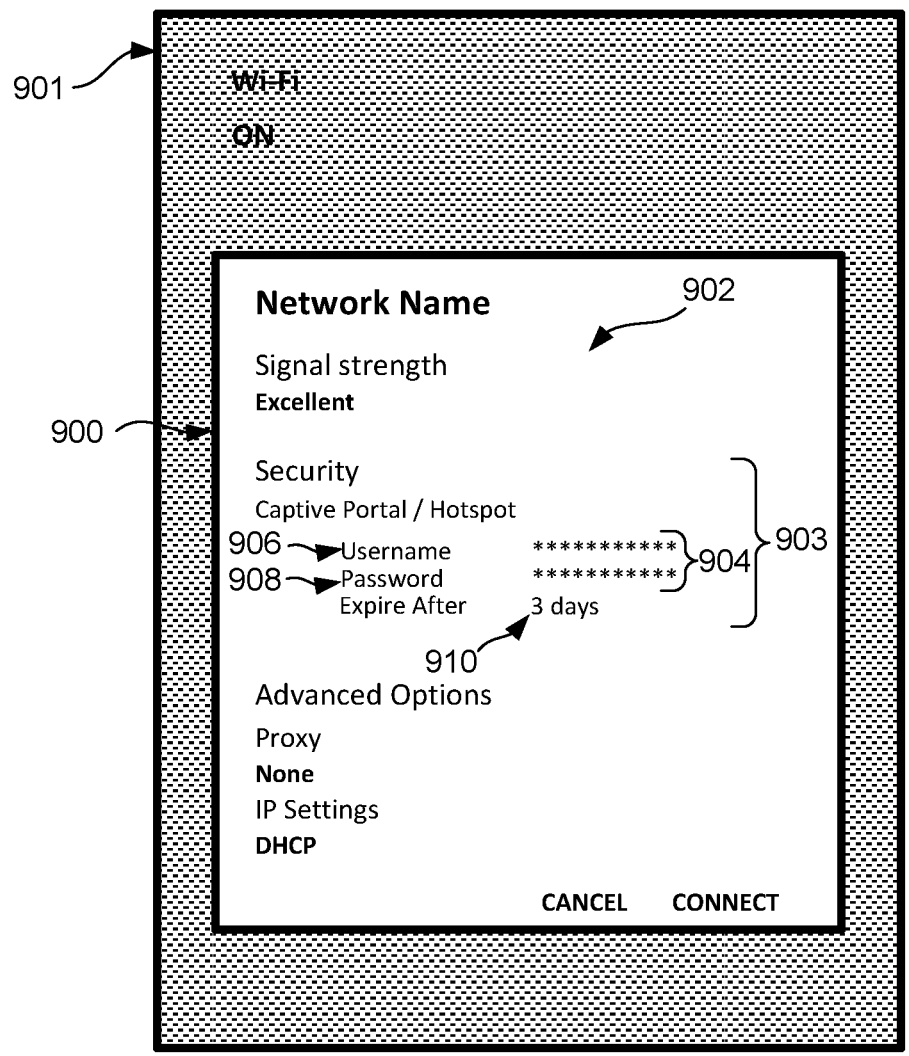
FIG. 9A shows an example user interface dialog box, showing details of a WLAN profile, that may be displayed on an electronic device.

FIG. 9A shows an example user interface dialog box 900 on a display 901 showing the opened WLAN profile 902. Additional information and/or interface elements not shown in FIG. 9A may be shown on display 901, such as various icons indicating status of the device, and other user interface options such as menus, webpages, etc. The dialog box 900 shows details of the WLAN profile 902, including a "Security" settings area 903 showing Captive Portal/Hoptspot credentials 904. The credentials 904 include a username 906 and a password 908. Also shown is a set duration 910 for which the credentials will be valid before they expire. For example, the duration may be set to a particular number of hours, days, or may be set to the last for the current session, or possibly to never expire. The user may be able to alter the credentials 904 and/or the set duration 910 in some embodiments. As described above, the CP/Hotspot credentials can replace the Security fields (e.g. WEP or WPA fields) currently existing in a WLAN profile since Captive Portal and Hotspot infrastructure uses open Wi-Fi Networks. However, from the user interface perspective shown in FIG. 9A, the credentials may be entered in separate fields (username 906 and password 908) specifically for Captive Portal/Hotspot credentials. Nevertheless, the actual storage space inside WLAN profiles will be the same as for secured enterprise Wi-Fi networks (i.e. 802.11x, EAP methods).

Figure 9B:
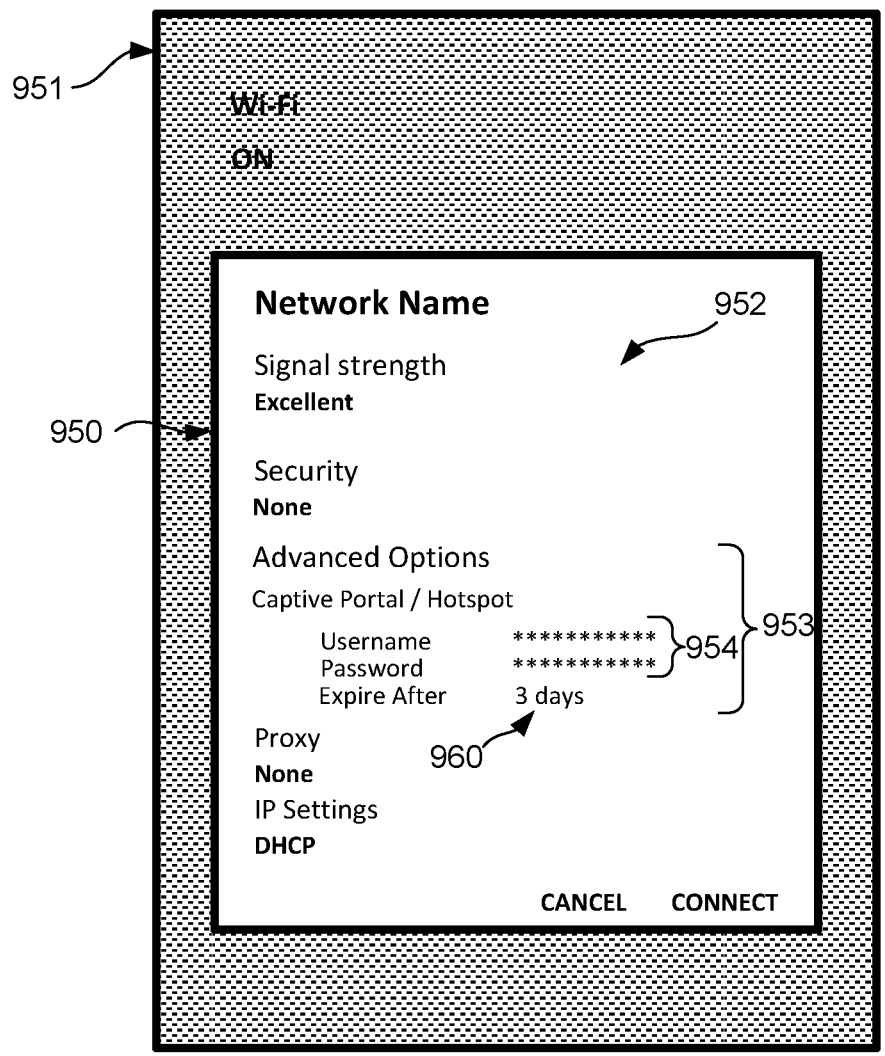
FIG. 9B shows another example user interface dialog box, showing details of a WLAN profile, that may be displayed on an electronic device.

FIG. 9B shows another example user interface dialog box 950 on a display 951 that is similar to the dialog box 900 shown in FIG. 9A. However, in this example, the dialog box 950 includes a WLAN profile 952 within an "Advanced Options" area 953 rather than the "Security" settings area 903 of FIG. 9A. The WLAN profile 952 in FIG. 9B includes credentials 954 and set duration 960 that are similar to the credentials 904 and set duration 910 in FIG. 9A. Additional information and/or interface elements not shown in FIG. 9B may be shown on display 951.

The various embodiments described herein may have benefits over conventional Captive Portal and Hotspot credential systems. For example, credentials saved in network settings (similar to enterprise WLAN network credentials including IEEE 802.11x EAP authentication methods) may be more secure than credentials conventionally saved in browser application storage. Automatically forwarding the credentials to the network to log in to the secured website may provide seamless connectivity after disconnections or idle/timeout periods. The may be no need to re-enter credentials as the authentication logic is moved into the WLAN network API space. Furthermore, some embodiments described above may provide one collocated configuration space for the secured webpage (e.g. Captive Portal or Hotspot) and network access (Internet/Intranet). For example, a single user interface location may be used for configuration of both the network settings and the Captive Portal or Hotspot, rather than having one user interface location or layer for configuring network settings, and a separate user interface location or layer for configuring the Captive Portal or Hotspot. In addition, application layer security credentials (e.g. HTTPS) may be stored along with WLAN Network layer or Link layer (i.e. Layer 2 level or Layer 3 level) security space as if the application layer credentials are WLAN network Enterprise security credentials.

Further, the embodiments described above may be implemented for any electronic device. An example mobile device 1000 that may implement the embodiments described above is described below with regard to FIG. 10.

Mobile device 1000 is typically a two-way wireless communication device having data and optionally voice communication capabilities. Mobile device 1000 generally has the capability to communicate with other computer systems on the Internet. Depending on the exact functionality provided, the mobile device may be referred to as a data messaging device, a two-way pager, a wireless email device, a cellular telephone with data messaging capabilities, a wireless Internet appliance, a wireless device, a user equipment, a vehicle, or a data communication device, as examples.

Where mobile device 1000 is enabled for two-way communication, it may incorporate a communication subsystem 1011, including a receiver 1012 and a transmitter 1014, as well as associated components such as one or more antenna elements 1016 and 1018, local oscillators (LOs) 1013, and a processing module such as a digital signal processor (DSP) 1020. As will be apparent to those skilled in the field of communications, the particular design of the communication subsystem 1011 will be dependent upon the communication network in which the device is intended to operate.

Network access requirements will also vary depending upon the type of network 1019. In some networks network access is associated with a subscriber or user of mobile device 1000. In some embodiments, a mobile device may require a removable user identity module (RUIM) or a subscriber identity module (SIM) card in order to operate on a network. The SIM/RUIM interface 1044 is normally similar to a card-slot into which a SIM/RUIM card can be inserted and ejected. The SIM/RUIM card can have memory and hold many key configurations 1051, and other information 1053 such as identification, and subscriber related information. Without a SIM card, the mobile device may still be capable of limited functionality.

Figure 10:
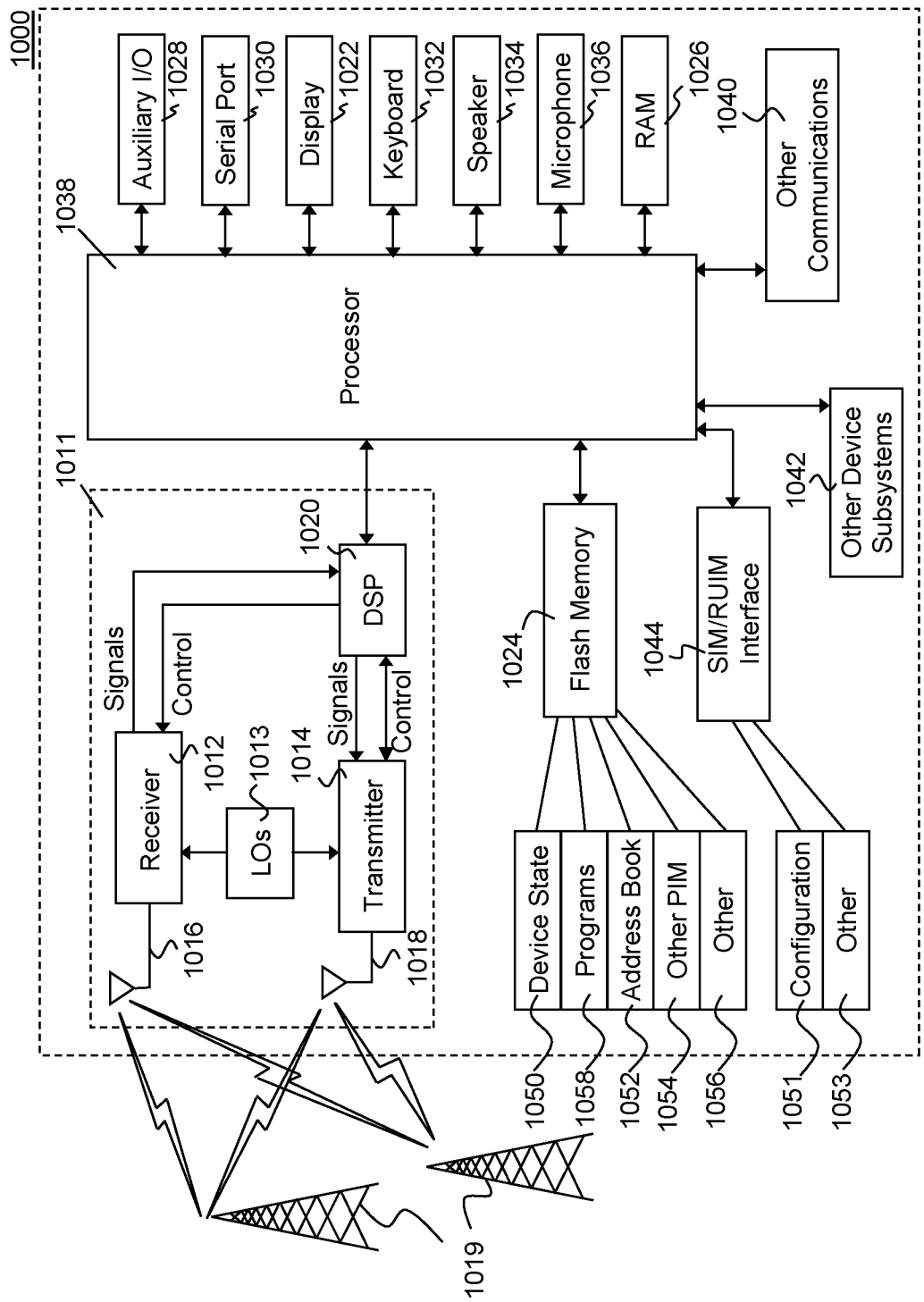
FIG. 10 is a block diagram of a mobile device according to one embodiment.

When required network registration or activation procedures have been completed, mobile device 1000 may send and receive communication signals over the network 1019. As illustrated in FIG. 10, network 1019 can include multiple base stations communicating with the mobile device.

Signals received by antenna 1016 through communication network 1019 are input to receiver 1012, which may perform such common receiver functions as signal amplification, frequency down conversion, filtering, channel selection and the like. Analog to digital (A/D) conversion of a received signal allows more complex communication functions such as demodulation and decoding to be performed in the DSP 1020. In a similar manner, signals to be transmitted are processed, including modulation and encoding for example, by DSP 1020 and input to transmitter 1014 for digital to analog (D/A) conversion, frequency up conversion, filtering, amplification and transmission over the communication network 1019 via antenna 1018. DSP 1020 not only processes communication signals, but also provides for receiver and transmitter control. For example, the gains applied to communication signals in receiver 1012 and transmitter 1014 may be adaptively controlled through automatic gain control algorithms implemented in DSP 1020.

Mobile device 1000 generally includes a processor 1038 which controls the overall operation of the device. Communication functions, including data and voice communications, are performed through communication subsystem 1011. Processor 1038 also interacts with further device subsystems such as the display 1022, flash memory 1024, random access memory (RAM) 1026, auxiliary input/output (I/O) subsystems 1028, serial port 1030, one or more keyboards or keypads 1032, speaker 1034, microphone 1036, other communication subsystem 1040 such as a short-range communications subsystem and any other device subsystems generally designated as 1042. Serial port 1030 could include a USB port or other port known to those in the art.

Some of the subsystems shown in FIG. 10 perform communication-related functions, whereas other subsystems may provide "resident" or on-device functions. Notably, some subsystems, such as keyboard 1032 and display 1022, for example, may be used for both communication-related functions, such as entering a text message for transmission over a communication network, and device-resident functions such as a calculator or task list.

Operating system software used by the processor 1038 may be stored in a persistent store such as flash memory 1024, which may instead be a read-only memory (ROM) or similar storage element (not shown). Those skilled in the art will appreciate that the operating system, specific device applications, or parts thereof, may be temporarily loaded into a volatile memory such as RAM 1026. Received communication signals may also be stored in RAM 1026.

As shown, flash memory 1024 can be segregated into different areas for both computer programs 1058 and program data storage 1050, 1052, 1054 and 1056. These different storage types indicate that each program can allocate a portion of flash memory 1024 for their own data storage requirements. Processor 1038, in addition to its operating system functions, may enable execution of software applications on the mobile device. A predetermined set of applications that control basic operations, including at least data and voice communication applications for example, will normally be installed on mobile device 1000 during manufacturing. Other applications could be installed subsequently or dynamically.

Applications and software may be stored on any computer readable storage medium. The computer readable storage medium may be a tangible or intransitory/non-transitory medium such as optical (e.g., CD, DVD, etc.), magnetic (e.g., tape) or other memory.

One software application may be a personal information manager (PIM) application having the ability to organize and manage data items relating to the user of the mobile device such as, but not limited to, email, calendar events, voice mails, appointments, and task items. Further applications may also be loaded onto the mobile device 1000 through the network 1019, an auxiliary I/O subsystem 1028, serial port 1030, short-range communications subsystem 1040 or any other suitable subsystem 1042, and installed by a user in the RAM 1026 or a non-volatile store (not shown) for execution by the processor 1038. Such flexibility in application installation increases the functionality of the device and may provide enhanced on-device functions, communication-related functions, or both.

In a data communication mode, a received signal such as a text message or webpage download will be processed by the communication subsystem 1011 and input to the processor 1038, which may further process the received signal for output to the display 1022, or alternatively to an auxiliary I/O device 1028.

A user of mobile device 1000 may also compose data items such as email messages for example, using the keyboard 1032, which may be a complete alphanumeric keyboard or telephone-type keypad, among others, in conjunction with the display 1022 and possibly an auxiliary I/O device 1028. Such composed items may then be transmitted over a communication network through the communication subsystem 1011.

For voice communications, overall operation of mobile device 1000 is similar, except that received signals may typically be output to a speaker 1034 and signals for transmission may be generated by a microphone 1036. Alternative voice or audio I/O subsystems, such as a voice message recording subsystem, may also be implemented on mobile device 1000. Although voice or audio signal output is preferably accomplished primarily through the speaker 1034, display 1022 may also be used to provide an indication of the identity of a calling party, the duration of a voice call, or other voice call related information for example.

Serial port 1030 in FIG. 10 may be implemented in a personal digital assistant (PDA)-type mobile device for which synchronization with a user's desktop computer (not shown) may be desirable, but is an optional device component. Such a port 1030 may enable a user to set preferences through an external device or software application and may extend the capabilities of mobile device 1000 by providing for information or software downloads to mobile device 1000 other than through a wireless communication network. As will be appreciated by those skilled in the art, serial port 1030 can further be used to connect the mobile device to a computer to act as a modem or for charging a battery on the mobile device.

Other communications subsystems 1040, such as a short-range communications subsystem, is a further optional component which may provide for communication between mobile device 1000 and different systems or devices, which need not necessarily be similar devices. For example, the subsystem 1040 may include an infrared device and associated circuits and components or a Bluetooth™ communication module to provide for communication with similarly enabled systems and devices. Subsystem 1040 may further include non-cellular communications such as Wi-Fi, WiMAX or Near Field Communications (NFC).

The methods described herein are provided as examples. The various functions of blocks of the method flowcharts shown in the figures and described above may be performed in different orders than described above. Furthermore, in some example embodiments, various blocks of the methods described above may be omitted.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at an electronic device for facilitating authentication on website over a wireless network, the method comprising:
maintaining, in a memory of the electronic device, a secure space, wherein the secure space is accessible only by a website credential Application Program Interface (API);
obtaining credentials for the website;
storing the credentials in association with a Uniform Resource Locator (URL) for the website in a Wireless Local Area Network (WLAN) profile of a network settings space on the electronic device, wherein the secure space comprises the network settings space, the WLAN profile comprising a Service Set Identifier (SSID) and an encryption key;
retrieving, by the website credential API, the credentials stored within the network settings space; and
forwarding the credentials to a network component.

2. The method of claim 1, wherein the wireless network is an open WLAN network, and the website is a landing page for the open WLAN network.

3. The method of claim 2, wherein the landing page is a Captive Portal or Hotspot landing page.

4. The method of claim 1, wherein the network component is an authentication server.

5. The method of claim 1, wherein the obtaining of the credentials comprises receiving the credentials as user input.

6. The method of claim 1, wherein the obtaining of the credentials comprises receiving the credentials in a transmission.

7. The method of claim 6, wherein the transmission is pushed to the electronic device.

8. The method of claim 1, wherein the storing of the credentials in the WLAN profile comprises storing the credentials in one or more network security fields in the WLAN profile.

9. The method of claim 8, wherein the one or more network security fields are Wired Equivalent Privacy (WEP) or Wi-Fi Protected Access (WPA) security fields.

10. The method of claim 1, wherein the website is a secured website.

11. The method of claim 1, further comprising obtaining authorization from a user of the electronic device to store the credentials within the network settings space.

12. The method of claim 1, further comprising obtaining authorization to share the credentials between two or more network profiles in the network settings space.

13. An electronic device capable of communication over a wireless network comprising:
a processor; and
a memory, coupled to the processor;
wherein the electronic device is configured to:
maintain, in the memory, a secure space, wherein the secure space is only accessible by a website credential Application Program Interface (API);
obtain credentials for a website;
store the credentials in association with a Uniform Resource Locator (URL) for the website in a Wireless Local Area Network (WLAN) profile of a network settings space, wherein the secure space comprises the network settings space, the WLAN profile comprising a Service Set Identifier (SSID) and an encryption key;
retrieve, by the website credential API, the credentials stored within the network settings space; and
forward the credentials to a network component.

14. The electronic device of claim 13, further comprising a Wi-Fi subsystem, the Wi-Fi subsystem comprising a Wi-Fi manager component, and the website credential API being within the Wi-Fi manager component.

15. The electronic device of claim 14, further comprising a receiver configured to receive a transmission including the credentials.

16. The electronic device of claim 13, wherein the website credential API is a Captive Portal API.

17. The electronic device of claim 13, wherein the network component is an authentication server.

18. The electronic device of claim 13, wherein the electronic device is further configured to store the credentials in the WLAN profile comprises storing the credentials in one or more network security fields in the WLAN profile, when it stores the credentials in the WLAN profile.

19. A non-transitory computer-readable medium having processor-executable instructions stored thereon that, when executed on an electronic device, cause the electronic device to:

maintain, in a memory of the electronic device, a secure space, wherein the secure space is only accessible by a website credential Application Program Interface (API);
obtain credentials for a website;
store the credentials in association with a Uniform Resource Locator (URL) for the website in a Wireless Local Area Network (WLAN) profile of a network settings space on the electronic device, wherein the secure space comprises the network settings space, the WLAN profile comprising a Service Set Identifier (SSID) and an encryption key;
retrieve, by the website credential API, the credentials stored within the network settings space; and
forward the credentials to a network component.

* * * * *